US012601696B2

(12) United States Patent
Yamano et al.

(10) Patent No.:  US 12,601,696 B2
(45) Date of Patent:     Apr. 14, 2026

(54) CRYSTAL STRUCTURE ANALYSIS METHOD, CRYSTAL STRUCTURE ANALYSIS DEVICE, AND CRYSTAL STRUCTURE ANALYSIS PROGRAM

(71) Applicant: Rigaku Corporation, Akishima (JP)

(72) Inventors: Akihito Yamano, Akishima (JP);
Takashi Matsumoto, Akishima (JP);
Hiroyuki Kanda, Akishima (JP)

(73) Assignee: Rigaku Corporation, Akishima (JP)

( * ) Notice: Subject to any disclaimer, the term of this patent is extended or adjusted under 35 U.S.C. 154(b) by 205 days.

(21) Appl. No.: 18/709,621

(22) PCT Filed: Nov. 15, 2022

(86) PCT No.: PCT/JP2022/042431
§ 371 (c)(1),
(2) Date: May 13, 2024

(87) PCT Pub. No.: WO2023/095682
PCT Pub. Date: Jun. 1, 2023

(65) Prior Publication Data
US 2025/0003896 A1      Jan. 2, 2025

(30) Foreign Application Priority Data

Nov. 25, 2021    (JP) ................................. 2021-191414

(51) Int. Cl.
*G01N 23/2055*       (2018.01)
(52) U.S. Cl.
CPC ...  *G01N 23/2055* (2013.01); *G01N 2223/056* (2013.01); *G01N 2223/302* (2013.01)
(58) Field of Classification Search
CPC ......... G01N 23/2055; G01N 2223/056; G01N 2223/302; G01N 2223/604; G01N 23/20058
See application file for complete search history.

(56) References Cited

U.S. PATENT DOCUMENTS

2007/0005268 A1* 1/2007 Higashi .............. G01N 23/2055
                                                                                  702/27
2012/0025094 A1* 2/2012 Benner ............ G01N 23/20058
                                                                                  250/396 R
(Continued)

FOREIGN PATENT DOCUMENTS

JP          2014142357 A      8/2014
WO      2020/160671 A1    8/2020

OTHER PUBLICATIONS

Blessing, Robert H., "Outlier Treatment in Data Merging", Research Papers, Journal of Applied Crystallography, 1997 (month unknown), vol. 30, pp. 421-426, ISSN 0021-8898. (6 pages).
(Continued)

*Primary Examiner* — Kiho Kim
(74) *Attorney, Agent, or Firm* — BUCHANAN INGERSOLL & ROONEY PC

(57)          ABSTRACT

A crystal structure analysis in which: each of a plurality of samples are irradiated while the angle of incidence is continuously changed by rotating the crystal, whereby diffraction spot intensity and reliability for a plurality of crystal lattice planes are determined and a data set (Data-1, Data-2, Data-3, . . . , Data-n) is acquired; whether or not to perform merging, which is a process of combining multiple sets of data into one, is determined for each individual set of data on the basis of a merging criterion (e.g., Rint, completeness); merging is performed on data for which merging is to be performed; and a crystal structure is determined according to merged data. A crystal structure analysis result is obtained in a crystal structure analysis method, a crystal structure analysis device, and a crystal structure analysis program in which a crystal structure is determined by data-processing and analyzing a plurality of diffraction profiles.

13 Claims, 12 Drawing Sheets

(56)     References Cited

U.S. PATENT DOCUMENTS

2014/0254763 A1\*  9/2014  Lauridsen ............ G01N 23/207
                                                   378/73
2018/0372658 A1\*  12/2018  He ..................... G01N 23/2055
2019/0145915 A1\*   5/2019  Kimijima ............ G01N 23/085
                                                   378/51

OTHER PUBLICATIONS

International Search Report (PCT/ISA/210) with translation and Written Opinion (PCT/ISA/237) mailed on Jan. 10, 2023, by the Japanese Patent Office as the International Searching Authority for International Application No. PCT/JP2022/042431. (8 pages).
Wilkinson, Max E., et al., "Methods for merging data sets in electron cryo-microscopy", Research Papers, Acta Cryst D, Structural Biology, Jul. 23, 2019, vol. D75, pp. 782-791, ISSN 2059-7983. (10 pages).
Extended European Search Report dated Nov. 19, 2025, issued by the European Patent Office in corresponding European Application No. 22898466.2-1001, (8 pages).
Higashiura, A. et al. "High-resolution X-ray crystal structure of bovine H-protein at 0.88 A resolution" vol. 66, Part 6, Jun. 2010, pp. 698-708.
Smeets, S. et al. "Serial electron crystallography for structure determination and phase analysis of nanocrystalline materials" Journal of Applied Crystallography, vol. 51, 2018, pp. 1262-1273.

\* cited by examiner

F I G.  1
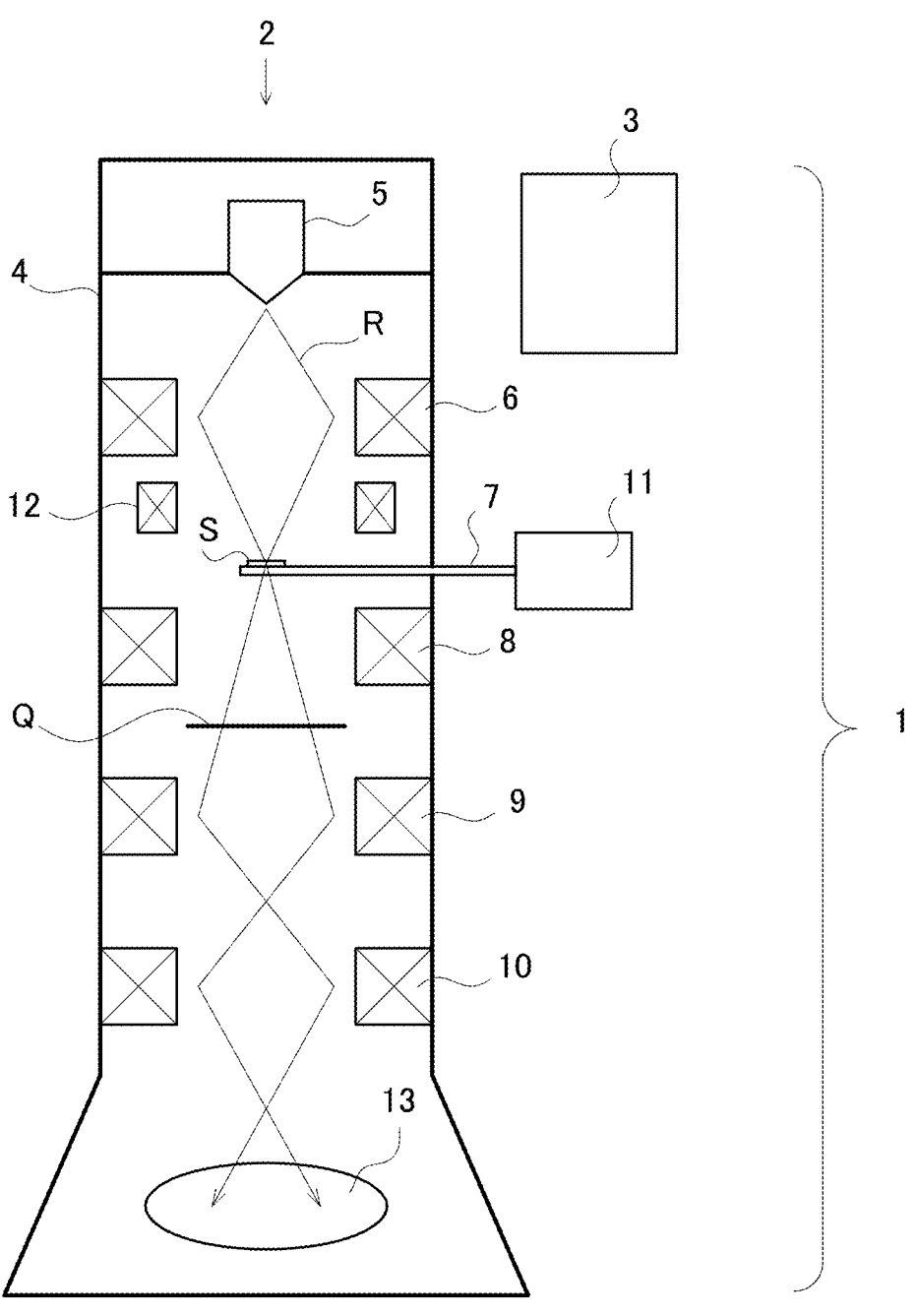

F I G. 2(a)
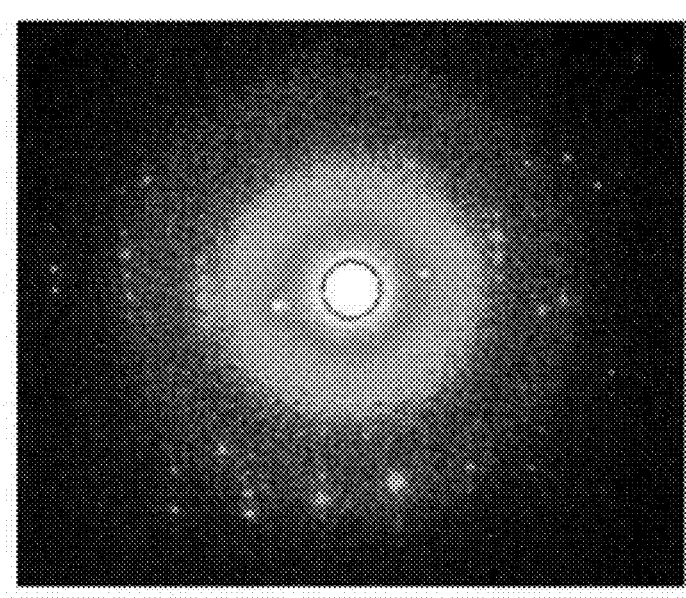
F I G. 2(b)
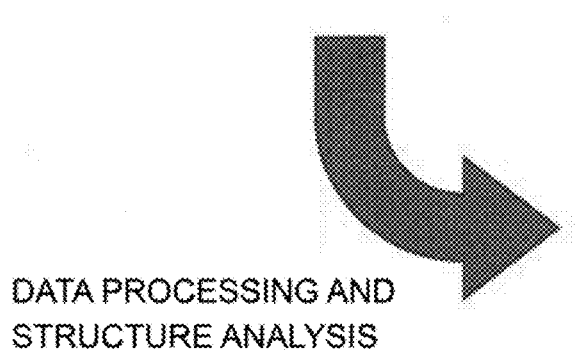
DATA PROCESSING AND
STRUCTURE ANALYSIS
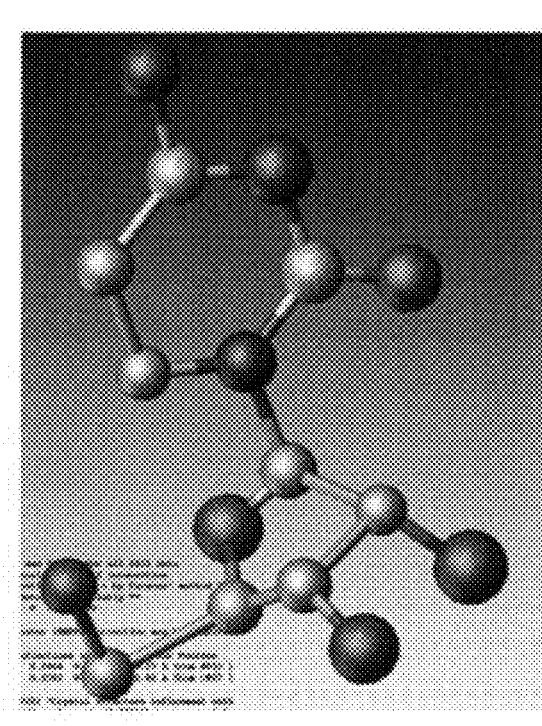

F I G . 3
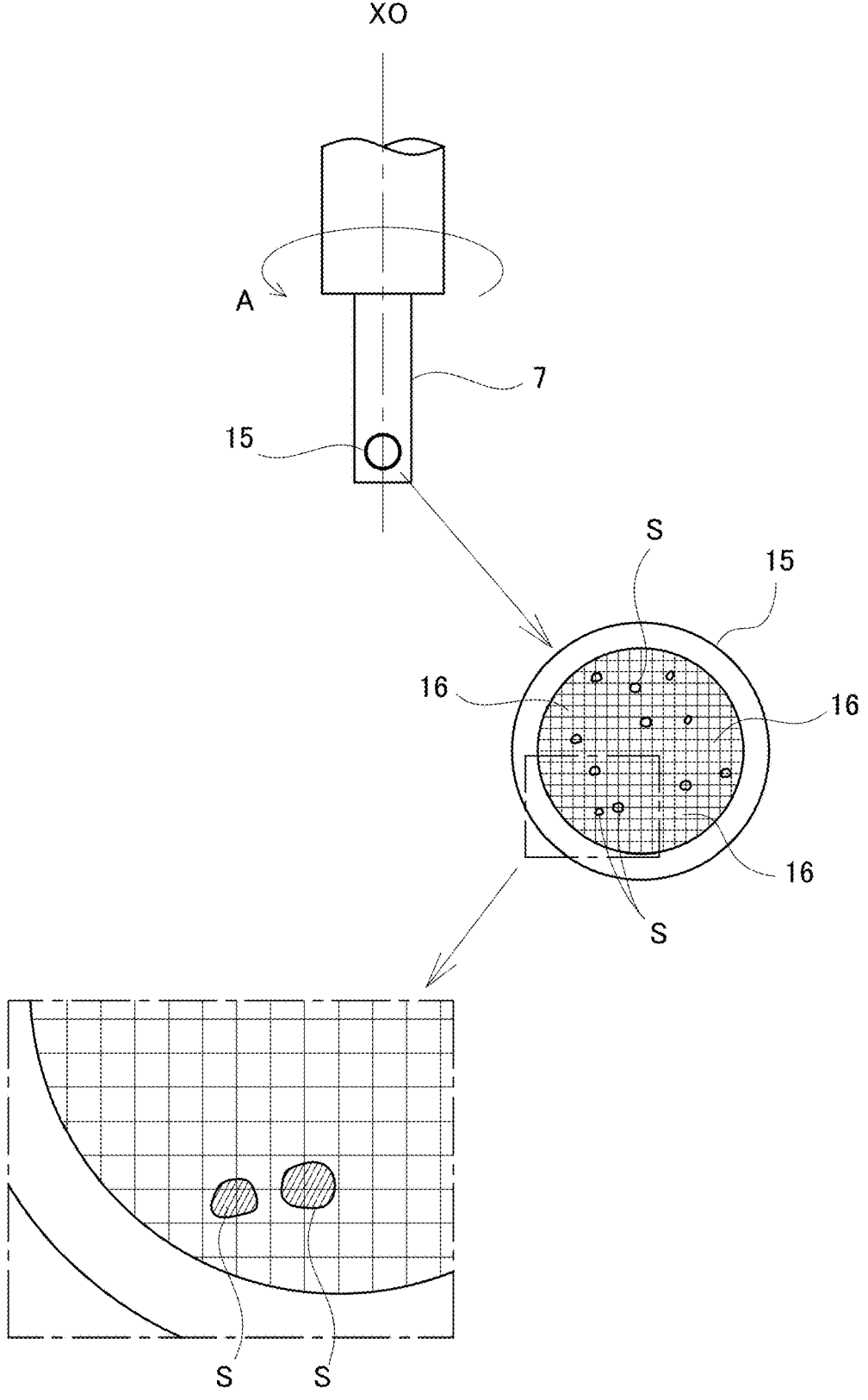

FIG. 4

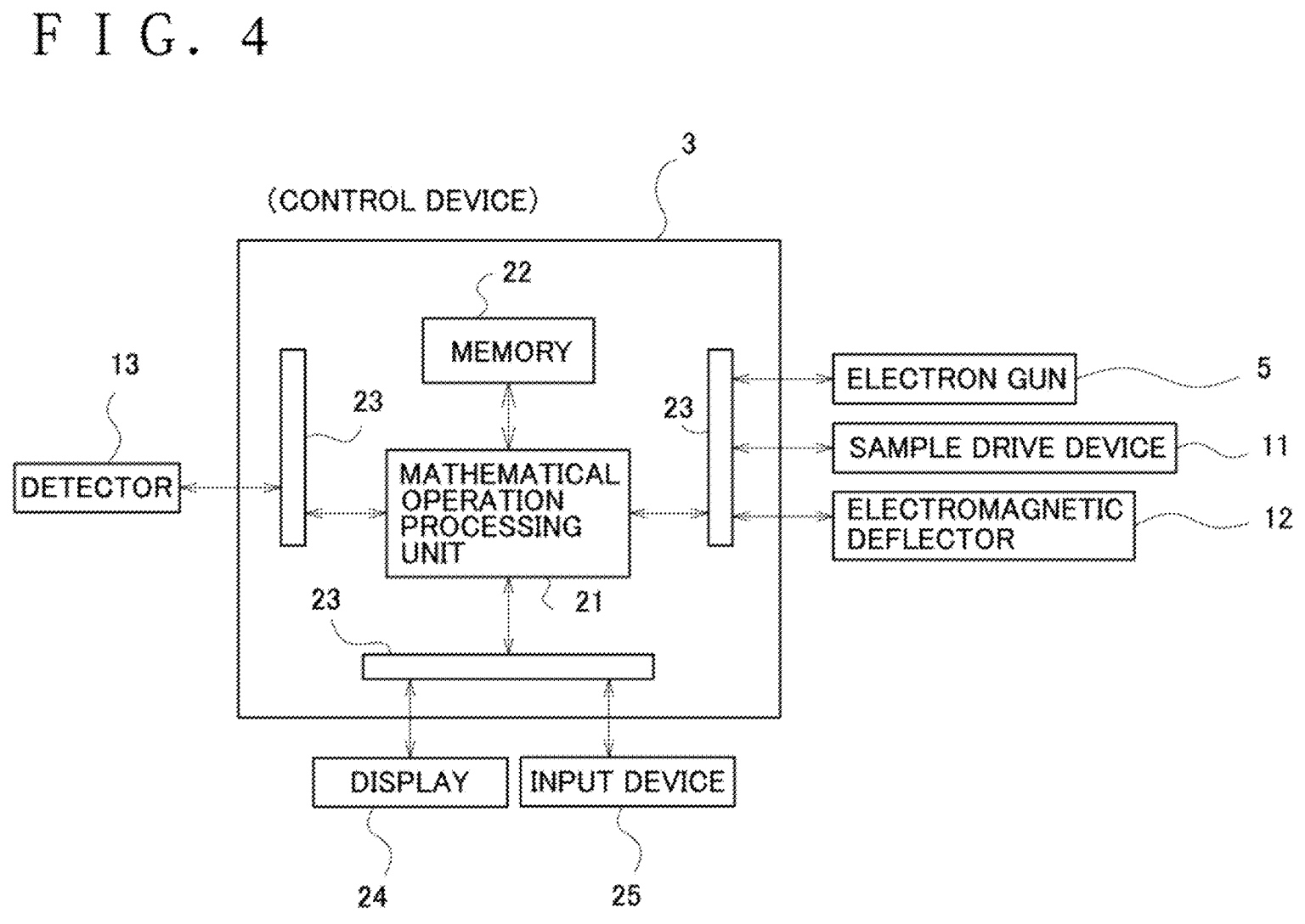

ELECTRON GUN — 5

SAMPLE DRIVE DEVICE — 11

ELECTROMAGNETIC DEFLECTOR — 12

(CONTROL DEVICE) — 3

23

23

MEMORY — 22

MATHEMATICAL OPERATION PROCESSING UNIT — 21

23

DETECTOR — 13

DISPLAY — 24

INPUT DEVICE — 25

FIG. 6

Data-1 (69%)

| MILLER INDEX h | k | l | INTENSITY | RELIABILITY |
|---|---|---|---|---|
| 0 | 0 | -1 | 431.64 | 8.99 |
| 0 | 0 | -2 | 330.51 | 7.03 |
| 0 | 0 | 2 | 328.56 | 7.07 |
| ⋮ | | | | |
| 4 | -7 | 5 | 169.38 | 4.12 |
| 4 | -8 | 6 | 1.28 | 0.27 |
| 4 | -10 | 6 | 1.48 | 0.22 (a) |
| 4 | -12 | 6 | 1.79 | 0.24 (b) |
| 4 | -13 | 6 | 1.23 | 0.24 |
| ⋮ | | | | |
| -11 | 2 | 2 | 1.27 | 0.14 (c) |
| 0 | 0 | 0 | 0.00 | 0.00 |

+

Data-2 (65%)

| MILLER INDEX h | k | l | INTENSITY | RELIABILITY |
|---|---|---|---|---|
| 0 | 0 | -1 | 456.55 | 9.78 |
| 0 | 0 | -2 | 340.61 | 7.51 |
| 0 | 0 | 2 | 382.98 | 8.97 |
| ⋮ | | | | |
| 4 | -7 | 5 | 158.77 | 6.45 |
| 4 | -9 | 6 | 15.45 | 0.33 (d) |
| 4 | -10 | 6 | 1.92 | 0.29 |
| 4 | -11 | 6 | 1.79 | 0.67 |
| 4 | -13 | 6 | 5.53 | 0.14 (e) |
| ⋮ | | | | |
| -11 | 3 | 1 | 2.16 | 0.17 |
| 0 | 0 | 0 | 0.00 | 0.00 |

=

Data-1+Data-2 (91%)

| MILLER INDEX h | k | l | INTENSITY | RELIABILITY |
|---|---|---|---|---|
| 0 | 0 | -1 | 444.10 | 13.28 |
| 0 | 0 | -2 | 330.51 | 7.43 |
| 0 | 0 | 2 | 355.74 | 7.07 |
| ⋮ | | | | |
| 4 | -7 | 5 | 163.00 | 5.41 |
| 4 | -8 | 6 | 1.28 | 0.27 |
| 4 | -9 | 6 | 15.45 | 0.33 |
| 4 | -10 | 6 | 1.70 | 0.25 |
| 4 | -11 | 6 | 1.79 | 0.67 |
| 4 | -12 | 6 | 3.38 | 0.24 |
| 4 | -13 | 6 | | 0.19 |
| ⋮ | | | | |
| -11 | 3 | 1 | 2.16 | 0.17 |
| -11 | 2 | 2 | 1.27 | 0.14 |
| 0 | 0 | 0 | 0.00 | 0.00 |

F I G .  7
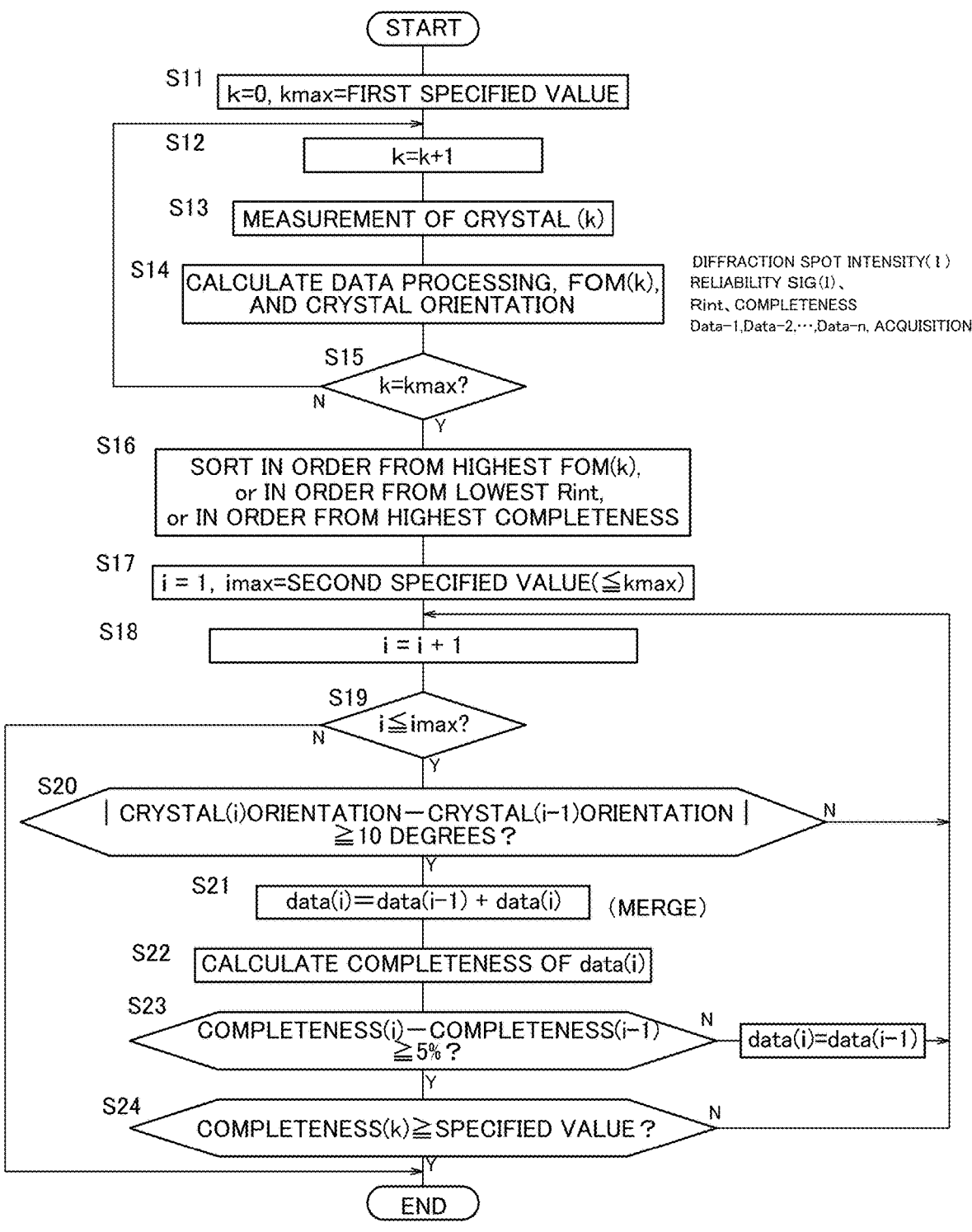

F I G. 9
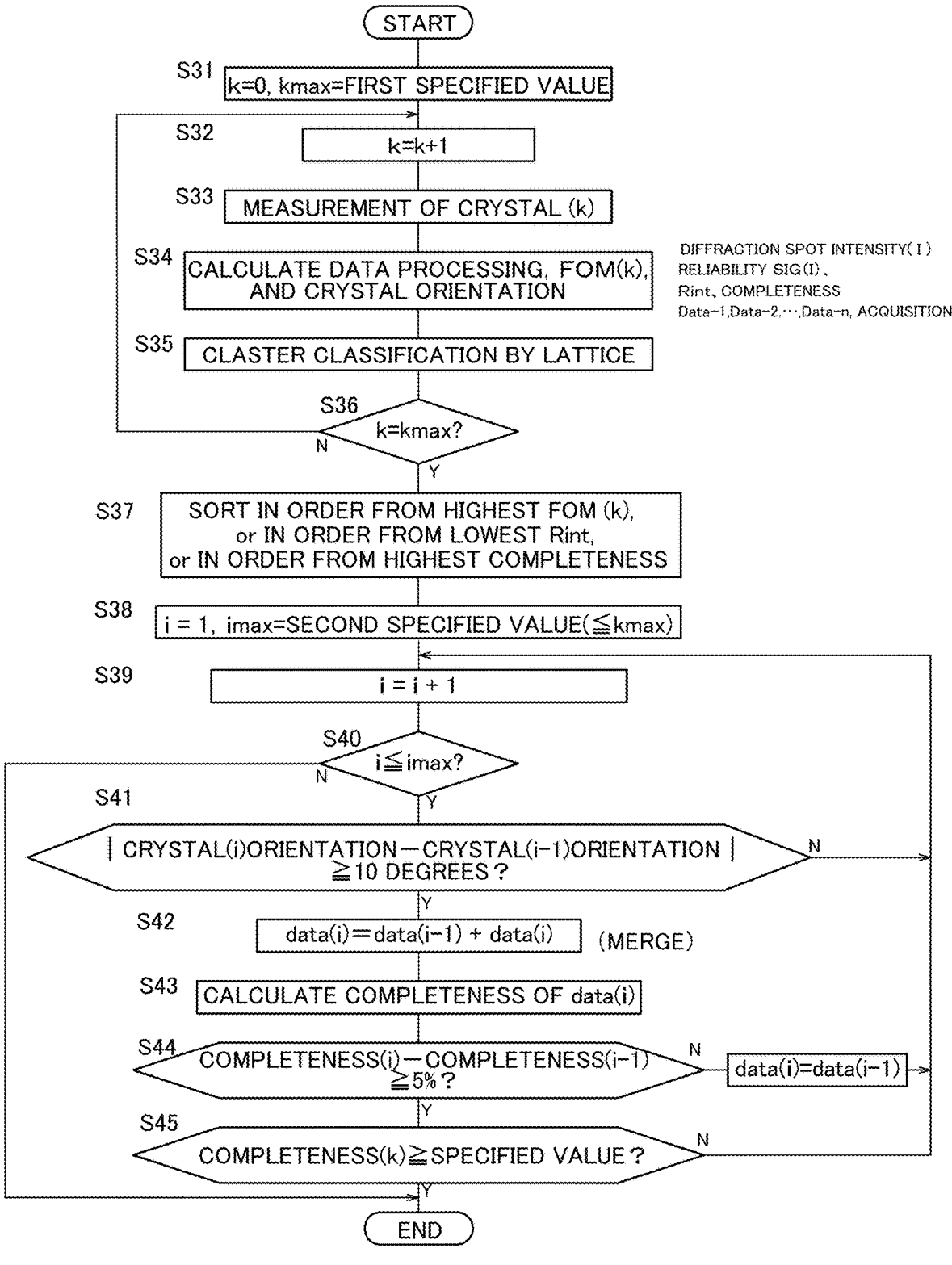

F I G.  1 0
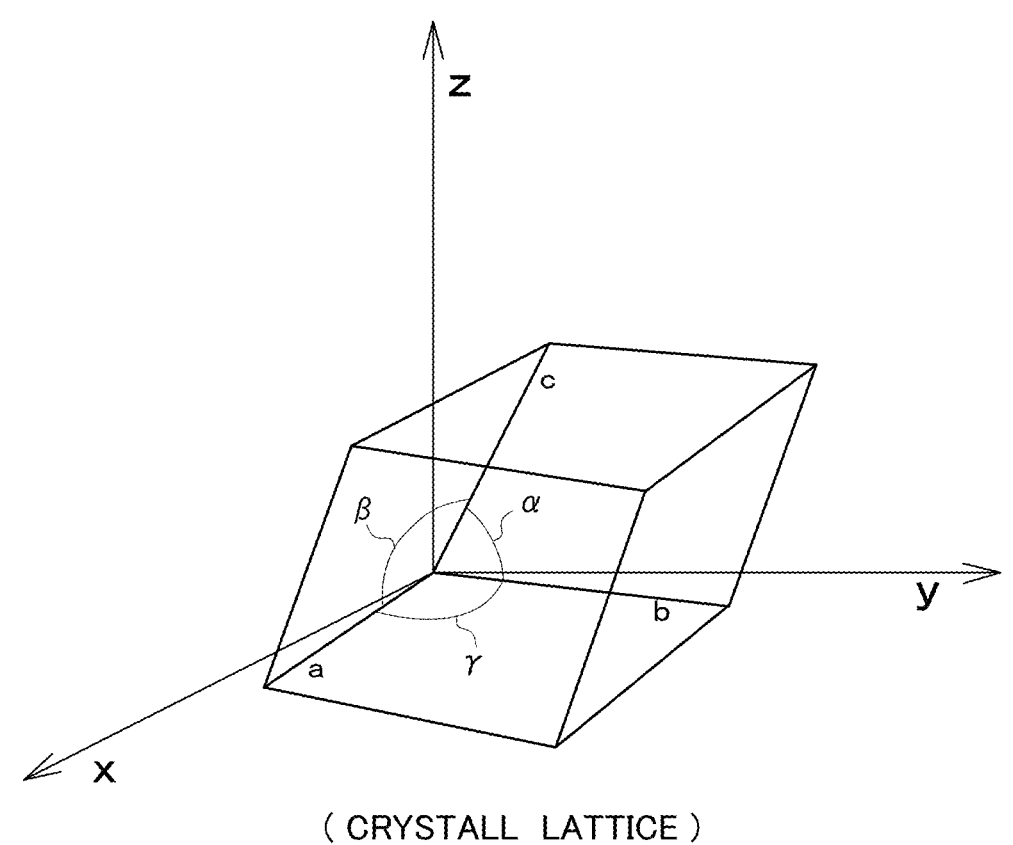
( CRYSTALL  LATTICE )

F I G. 1 1

| MOLECULAR STRUCTURE | | | |
|---|---|---|---|

CLUSTER NUMBER

| SAMPLE NAME | CYTIDINE | ACETAMINOPHEN | POTASSIUM TETRACHLOROPLATINATE |
|---|---|---|---|
| CHEMICAL FORMULA | $C_9H_{13}N_3O_5$ | $C_8H_9NO_2$ | $K_2PtCl_4$ |
| CRYSTAL SYSTEM | orthorhombic | Monoclinic | tetragonal |
| SPACE GROUP | $P2_12_12_1$ | $P2_1/n$ | $P4/mmm$ |
| a (Å) | 5.28±10% | 7.17±10% | 7.222±10% |
| b (Å) | 14.4±10% | 9.4±10% | 7.222±10% |
| c (Å) | 15.2±10% | 11.8±10% | 4.251±10% |
| α (°) | 90±10% | 90±10% | 90±10% |
| β (°) | 90±10% | 98±10% | 90±10% |
| γ (°) | 90±10% | 90±10% | 90±10% |

F I G .   1 2
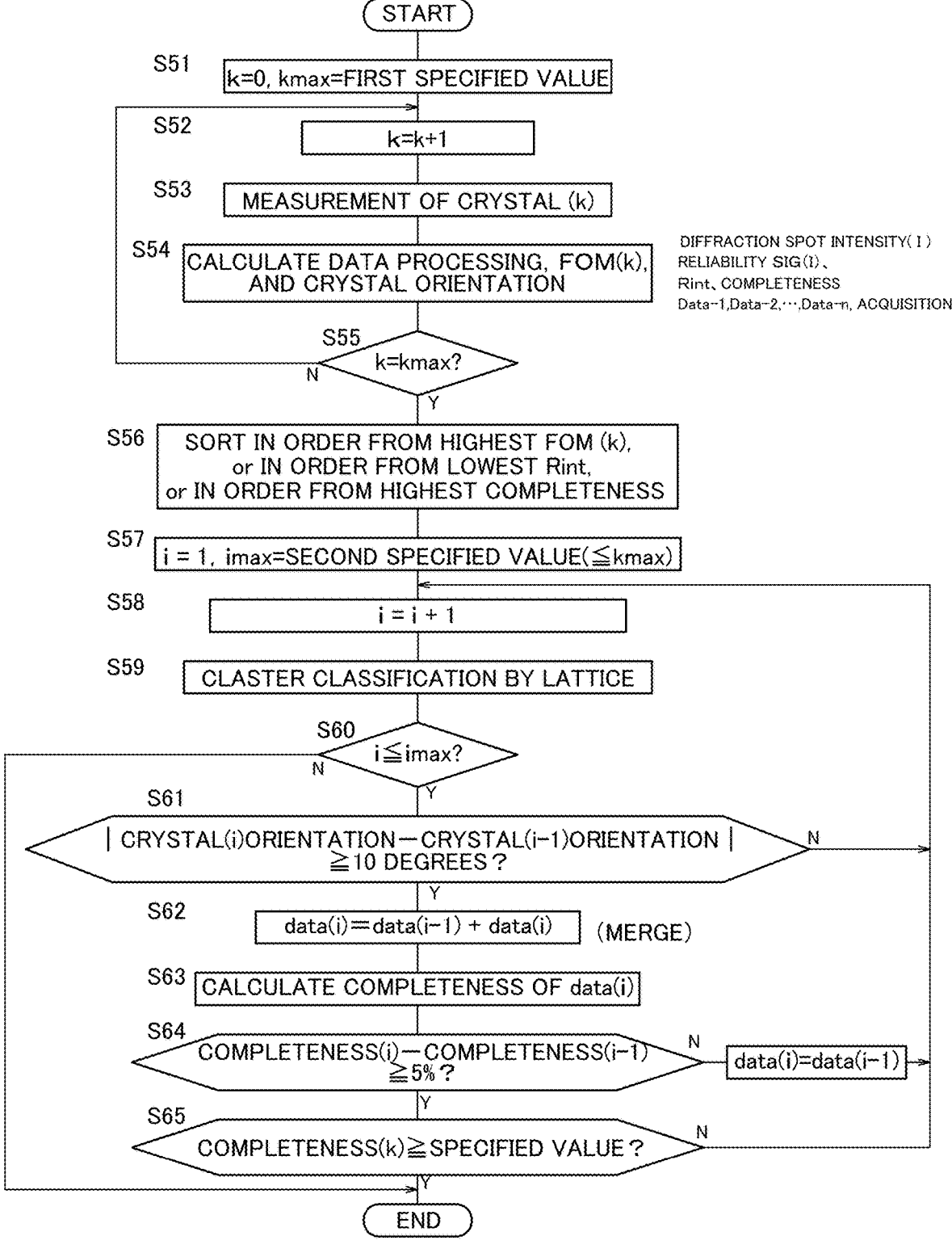
DIFFRACTION SPOT INTENSITY(I)
RELIABILITY SIG(I)、
Rint、COMPLETENESS
Data-1,Data-2,…,Data-n, ACQUISITION

CRYSTAL STRUCTURE ANALYSIS METHOD, CRYSTAL STRUCTURE ANALYSIS DEVICE, AND CRYSTAL STRUCTURE ANALYSIS PROGRAM

TECHNICAL FIELD

The present invention relates to a crystal structure analysis method, a crystal structure analysis device, and a crystal structure analysis program with which the crystal structure of a sample is analyzed using radiation such as electron beams, X-rays, neutron beams, etc.

BACKGROUND ART

An example of a method for understanding the properties of a material is to analyze the crystal structure of the material. In the prior art, an example of a method for analyzing the crystal structure of a material is an analysis method that uses radiation such as electron beams, X-rays, neutron beams, etc. For example, according to Patent Literature 1 (JP-A 2014-142357) a plurality of micro regions within a sample are sequentially irradiated with an electron beam, and a plurality of diffraction profiles for the plurality of micro regions are acquired by acquiring diffraction data using electron beams diffracted in the individual micro regions, and then the crystal structure of a sample is analyzed on the basis of the plurality of diffraction profiles.

In the field of data processing, a process called merging has been performed in the prior art in, for example, Non-patent Literature 1 (Acta Cryst. (2019). D75, 782-791 "Methods for merging data sets in electron cryo-microscopy," Wilkinson et al.) and Non-patent Literature 2 (Journal of Applied Crystallography (1997). 30, 421-426, "Outlier Treatment in Data Merging," Robert H. Blessing). Merging is the process of combining (i.e., compiling) a plurality of sets of data into one piece of data.

The inventors have found that when the crystal structure of a material is determined on the basis of a plurality of sets of diffraction data, even if the individual sets of diffraction data have low completeness, the completeness of diffraction data obtained by merging the individual sets of diffraction data may increase. If such diffraction data having high completeness is used, the crystal structure of the material can be analyzed with high reliability.

However, in crystal structure analysis using radiation, a large amount of diffraction data is acquired from a large number of crystals for one type of sample. Merging all of these sets of data requires large data processing power, large costs, and long processing times. In addition, simply merging data in crystal structure analysis did not provide highly reliable results.

CITATION LIST

Patent Literature

Patent Literature 1: JP-A 2014-142357

Non-Patent Literature

Non-patent Literature 1: Acta Cryst. (2019). D75, 782-791 "Methods for merging data sets in electron cryo-microscopy," Wilkinson et al.
Non-patent Literature 2: Journal of Applied Crystallography (1997). 30, 421-426, "Outlier Treatment in Data Merging," Robert H. Blessing

SUMMARY OF THE INVENTION

Technical Problem

The present invention was devised in view of the above problems in prior-art crystal structure analysis methods described above, it being an object of the invention to provide a crystal structure analysis method, a crystal structure analysis device, and a crystal structure analysis program with which highly reliable results of crystal structure analysis can be obtained.

Solution to Problem

A first embodiment of a crystal structure analysis method according to the present invention is a crystal structure analysis method in which a crystal structure is determined on the basis of a plurality of samples, the crystal structure analysis method comprising: a data acquisition step in which each of the plurality of samples are irradiated with radiation while the angle of incidence of the radiation is continuously changed by rotating the sample, whereby diffraction spot intensity and reliability for a plurality of crystal lattice planes in the individual samples are determined and data (for example, the Data-1, Data-2, Data-3, . . . , Data-n of FIG. 6) is acquired; a merging determination step in which whether or not to perform merging, which is a process of combining multiple data sets into one, is determined for each individual piece of data on the basis of a merging criterion (i.e., a merging reference indicator); a merging execution step in which merging, which is a process for combining multiple data sets into one, is performed on data for which it was determined that merging is to be performed; and a crystal structure identification step in which a crystal structure is determined according to merged data (i.e., post-merging data) obtained as a result of the merging.

The symbols enclosed in parentheses in the above description are appended with corresponding symbols in the "DESCRIPTION OF EMBODIMENTS" to make the invention easier to understand, and do not limit the invention.

Generally, when diffracted rays impinge on a detector, the diffracted rays impinge on the detection surface of the detector in the form of dots (i.e., spots). The spots of incidence of spot-form diffracted rays are the above-mentioned "diffraction spots." The "diffraction spot intensity" is the intensity of diffracted rays that impinge on the detection surface of the detector in dot form.

According to the crystal structure analysis method according to the present invention, whether or not to perform merging is determined on the basis of a merging criteria (i.e., a merging reference indicator, or a reference indicator of merging, or specific value for merging), and a crystal structure having high reliability can be obtained by selecting and merging multiple sets of data in accordance with the determination result. When merging is performed on numerous sets of diffraction data, a determination is made on the basis of a merging criteria as to whether data is to be merged or data is not to be merged, whereby the load of data processing can therefore be reduced, and it is therefore possible to perform an analysis process in a short time and at low cost.

In a second embodiment of the crystal structure analysis method according to the present invention: in the data acquisition step, while a first sample, which is one of the plurality of samples, is irradiated with radiation, the angle of incidence of the radiation on the first sample is continuously changed by rotating the sample, whereby diffraction intensities and degrees of reliability for a plurality of crystal lattice planes in the first sample are determined and first data (for example, the Data-1 of FIG. 6) is acquired, and the sample being irradiated with radiation is replaced with a second sample, which is another of the plurality of samples, and the angle of incidence of the radiation on the second sample is continuously changed by rotating the sample, whereby diffraction spot intensities and degrees of reliability for a plurality of crystal lattice planes in the second sample are determined and second data (for example, the Data-2 of FIG. 6) is acquired; in the merging determination step, whether or not to perform merging, which is a process for combining multiple sets of data into one, is determined for both the first data and the second data on the basis of merging criteria; and in the merging execution step, merging, which is a process for combining multiple sets of data into one, is performed on the first data for which it was determined that merging is to be performed and the second data for which it was determined that merging is to be performed.

This embodiment is a crystal structure analysis method in which data (Data-1, Data-2) is acquired for two samples and merging is performed on two sets of data for which it was determined that merging is to be performed. This embodiment is shown in, for example, FIGS. 5, 7, 9, and 12 in the drawings of the present application.

A third embodiment of the crystal structure analysis method according to the present invention is the crystal structure analysis method of the second embodiment, wherein: radiation is also irradiated onto an nth (n being positive integer other than 1 and 2) sample other than the first sample and the second sample in the plurality of samples and the angle of incidence of the radiation on the nth sample is continuously changed by rotating the sample, whereby diffraction spot intensities and degrees of reliability for a plurality of crystal lattice planes in the sample are determined and nth data is acquired; whether or not to perform merging is determined for the nth data on the basis of merging criteria; and nth data for which it was determined that merging is to be performed is also merged with the merged data set that was obtained until the nth data is acquired.

This embodiment is related to the second embodiment in which merging is performed on two samples, and is characterized in that merging is also sequentially performed on each of three or more samples.

More specifically, for example, merging is performed on the first two (Data-1+Data-2) of multiple sets of data (Data-1, Data-2, . . . , Data-n), merging is then performed on the merged data set and the next data (Data-3) to obtain merged data set (Data-1+Data-2+Data-3), and then merging is repeatedly performed on the merged data set (Data-1+Data-2+ . . . +Data-(n−1)) and the next data (Data-n) to obtain the merged data set (Data-1+Data-2+ . . . +Data-(n−1)+Data-n). According to this crystal structure analysis method, merging can be performed more efficiently, and a crystal structure having high reliability can be obtained.

This embodiment is shown in, for example, FIGS. 5, 7, 9, and 12 in the drawings of the present application.

A fourth embodiment of the crystal structure analysis method according to the present invention is related to the crystal structure analysis method of the first embodiment, and this embodiment is characterized in that: in the data acquisition step, three or more of the plurality of samples are individually irradiated with radiation while the angle of incidence of the radiation is continuously changed by rotating the crystal, whereby diffraction intensities and degrees of reliability for a plurality of crystal lattice planes in the individual samples are determined and data (for example, the Data-1, Data-2, Data-3, . . . , Data-n of FIG. 6) is acquired; and in the merging execution step, merging, which is a process for combining the multiple sets of data into one, is performed on three or more data sets for which it was determined that merging is to be performed.

This embodiment is a crystal structure analysis method in which data is obtained all at once for three or more samples, and a determination of whether or not to perform merging is performed on the samples, and then merging is performed all at once on multiple sets of data for which it was determined that merging is to be performed.

In a fifth embodiment of the crystal structure analysis method according to the present invention, the merging is at least one of the following: merging according to diffraction spot intensity, merging according to reliability (SIG(I)), and merging that supplements sections where data is missing.

In a sixth embodiment of the crystal structure analysis method according to the present invention, the merging criterion is Rint and/or completeness and/or crystal orientation.

A seventh embodiment of the crystal structure analysis method according to the present invention is characterized in that in the merging determination step, the determination of whether or not to perform merging is performed on the individual set of data each time one of the multiple sets of data (for example, Data-1, Data-2, . . . , Data-n) is acquired. That is, the details of the present embodiment are that sequential measurement is performed.

This embodiment is shown in, for example, FIG. 5 in the drawings of the present application.

An eighth embodiment of the crystal structure analysis method according to the present invention is characterized in that in the merging determination step, the determination of whether or not to perform merging is performed on each of the acquired multiple sets of data (for example, Data-1, Data-2, . . . , Data-n) after a predetermined number of the multiple sets of data have been acquired. That is, the details of the present embodiment are that continuous measurement is performed.

This embodiment is shown in, for example, FIGS. 7, 9, and 12 in the drawings of the present application.

A ninth embodiment of the crystal structure analysis method according to the present invention is characterized in that the predetermined number of continuously acquired data sets are arranged on the basis of a sorting criterion (for example, FOM, Rint, completeness). According to this embodiment, rapid processing is possible because merging can be applied in order starting with data suitable for an objective.

This embodiment is shown in, for example, FIGS. 7, 9, and 12 in the drawings of the present application.

In a tenth embodiment of the crystal structure analysis method according to the present invention, the sorting criterion (i.e., sorting reference indicator) is at least one of the following: FOM, Rint, and completeness.

This embodiment is shown in, for example, FIGS. 7, 9, and 12 in the drawings of the present application.

An eleventh embodiment of the crystal structure analysis method according to the present invention is characterized in that after the predetermined number of sets of the data (for example, Data-1, Data-2, . . . , Data-n) has been acquired, the acquired multiple sets of data are classified into clusters on the basis of crystal lattices, and merging is performed on data classified in the same cluster, and further merging is not performed among different data. According to this embodiment, even when a sample contains microcrystals of multiple different compounds, a crystal structure for each compound can be acquired.

This embodiment is shown in, for example, FIGS. 9 and 12 in the drawings of the present application.

A crystal structure analysis device according to the present invention identifies a crystal structure on the basis of a plurality of samples (S), said device comprising: a radiation source (e.g., electron gun 5) that emits radiation; a radiation incidence means (e.g., condenser lens 6, deflector 12) that causes the radiation emitted from the radiation source to be incident on the samples; a sample drive device (11) that moves (i.e., rotates and translates) the samples; a detector (13) that detects radiation diffracted by the samples; a mathematical operation processing unit (21) that controls the actions of the radiation source, the radiation incidence means, the sample drive device, and the detector and executes a mathematical operation for crystal structure analysis on a signal outputted by the detector; and a program (memory 22) that instructs the mathematical operation processing unit to perform a crystal structure analysis procedure, wherein the crystal structure analysis device characterized in that the program causes the mathematical operation processing unit to execute the following steps: a data acquisition step in which each of the plurality of samples are irradiated with radiation while the angle of incidence of the radiation is changed, whereby diffraction spot intensities and degrees of reliability for a plurality of crystal lattice planes in the individual samples are determined and data is acquired; a merging determination step in which whether or not to perform merging, which is a process of combining multiple sets of data into one, is determined for each individual set of data on the basis of a merging criterion; a merging execution step in which merging, which is a process for combining multiple sets of data into one, is performed on data for which it was determined that merging is to be performed; and a crystal structure determination step in which a crystal structure is determined according to merged data obtained as a result of the merging.

The numbers, letters, etc., written in parentheses in the above description are appended with corresponding symbols in the "DESCRIPTION OF EMBODIMENTS" to make the invention easier to understand, and are not intended to limit the invention.

A crystal structure analysis program according to the present invention is a program that instructs a crystal structure analysis procedure to be performed, in which a crystal structure is determined on the basis of a plurality of samples, said program causing a computer to execute: a procedure in which each of the plurality of samples are irradiated with radiation while the angle of incidence of the radiation is continuously changed by rotating the sample, whereby diffraction spot intensities and degrees of reliability for a plurality of crystal lattice planes in the individual samples are determined and data is acquired; a procedure in which whether or not to perform merging, which is a process of combining multiple sets of data into one, is determined for each individual set of data on the basis of a merging reference criterion; a procedure in which merging, which is a process for combining multiple sets of data into one, is performed on data for which it was determined that merging is to be performed; and a procedure in which a crystal structure is determined according to merged data obtained as a result of the merging.

BRIEF DESCRIPTION OF DRAWINGS

FIG. 1 is a view showing an embodiment of a crystal structure analysis device according to the present invention;

FIGS. 2(*a*) and 2(*b*) are views schematically showing functions of the crystal structure analysis device of FIG. 1;

FIG. 3 is a plan view showing a sample holder, which is a component of the crystal structure analysis device of FIG. 1;

FIG. 4 is a block diagram showing a control device, which is a component of the crystal structure analysis device of FIG. 1;

FIG. 6 is a chart showing data and merged data;

FIG. 7 is a flowchart showing a flow of a first continuous measurement, which is another embodiment of the crystal structure analysis method according to the present invention;

FIG. 9 is a flowchart showing a flow of a second continuous measurement, which is another embodiment of the crystal structure analysis method according to the present invention;

FIG. 10 is a view schematically showing a crystal lattice that is a classification criterion in cluster classification;

FIG. 11 shows an example of differences in crystal lattices according to molecular structure; and FIG. 12 is a flowchart showing a flow of a third continuous measurement, which is yet another embodiment of the crystal structure analysis method according to the present invention.

Figure 5:
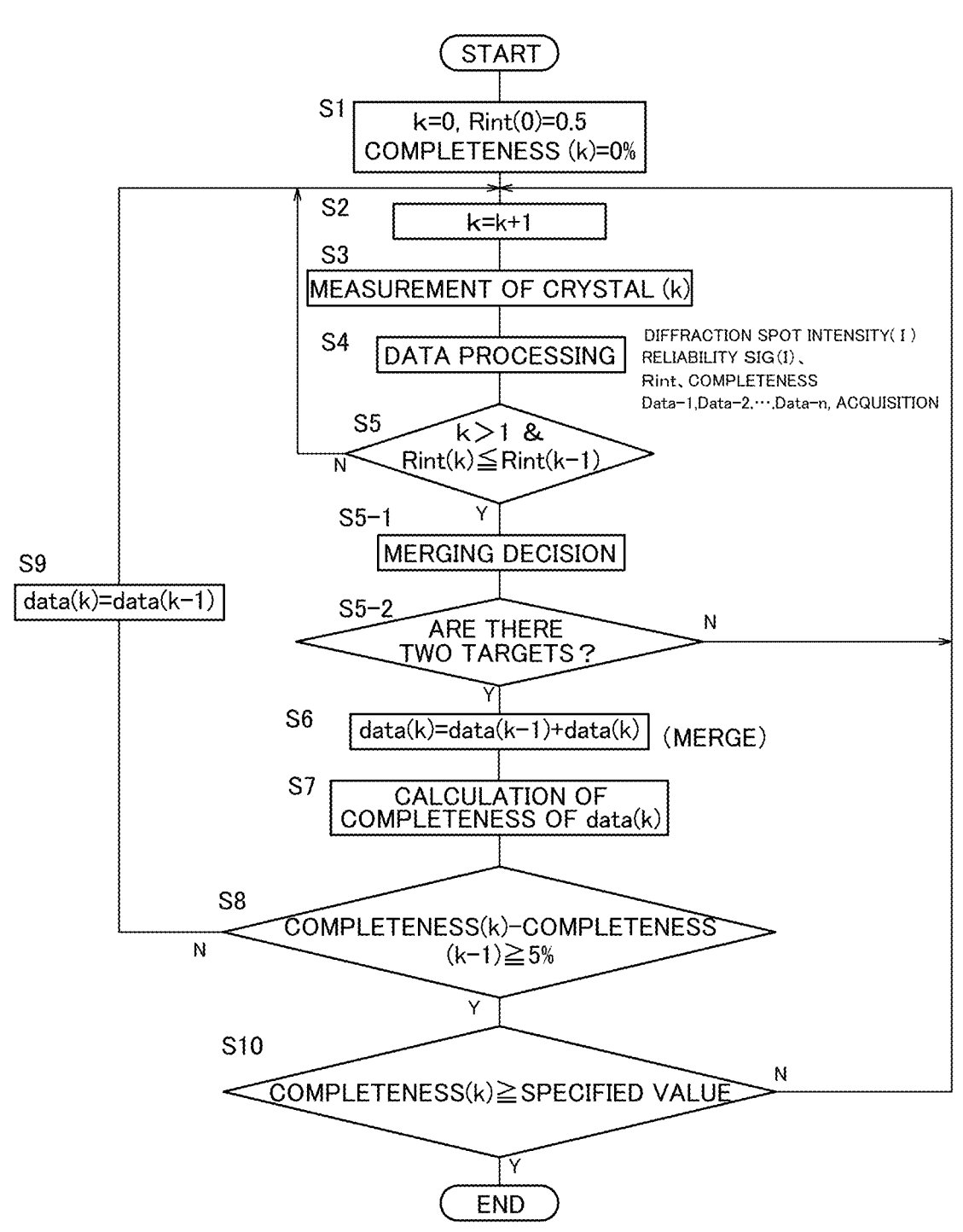
FIG. 5 is a flowchart showing a flow of sequential measurement, which is one embodiment of a crystal structure analysis method according to the present invention.

DESCRIPTION OF EMBODIMENTS crystal structure analysis method and device according to the present invention are described below on the basis of embodiments. It shall be apparent that the present invention is not limited to these embodiments. In addition, the main parts of the invention are illustrated, and the illustration of parts unrelated to the invention may be omitted.

First Embodiment

FIG. 1 shows an embodiment of a crystal structure analysis device according to the present invention. A crystal structure analysis device 1 of the present embodiment has an electron microscope mechanism part 2 and a control device 3. The electron microscope mechanism part 2 has a column (i.e., a machine casing) 4. The interior of the column 4 is provided with an electron gun 5, a condenser lens 6, a sample holder 7, an objective lens 8, an intermediate lens system 9, and a projection lens system 10. A detector 13 is provided at the bottom part of the interior of the column 4. The detector 13 is, for example, formed by arranging a plurality of pixels (i.e., picture elements) in a planar form. When X-rays are incident on individual pixels, electrical signals are outputted from those pixels. The sample holder 7 is driven by a sample drive device 11. An electromagnetic deflector 12 is provided above the sample holder 7.

In the present embodiment, the electron gun 5 constitutes a radiation source. In addition, the condenser lens 6 and the electromagnetic deflector 12 constitute a radiation incidence means.

A sample S is placed on the upper surface of the tip end of the sample holder 7. An electron beam R emitted from the electron gun 5 is focused (i.e., is conditioned optimally for electron diffraction) by a condenser lens 6 and irradiated onto the sample S. If necessary, the electromagnetic deflector 12 changes the direction of the electron beam. The irradiated electron beam is diffracted by a crystal lattice plane of the sample S and is transmitted through the sample S. The electron beam diffracted by the sample S forms a diffraction image Q on a focal plane of the objective lens 8. The diffraction image Q is magnified by the intermediate lens system 9 and the projection lens system 10 and is imaged onto the detector 13. This imaging forms a diffraction image on the detector 13. A diffraction image appears as shown in, for example, FIG. 2(*a*).

FIG. 3 shows the tip end portion of the sample holder 7 viewed from above in FIG. 1. A grid 15 is mounted on the tip end of the sample holder 7. The grid 15 is a lattice-like member. The grid 15 has meshes (i.e., lattices) 16. The meshes 16 are made, for example, by forming a large number of straight lines on a disc-form metal member or a disc-form resin member by printing or other methods. After the sample is prepared into particles having appropriate size, the sample is placed on the grid 15 in a dispersed state. The outer diameter of the grid 15 is, for example, a diameter of 3 mm. The size of one lattice 16 is, for example, 100 μm×100 μm. One particle of a compound is one sample S. A plurality of crystals may be present in each of the plurality of lattices 16. That is, tens of crystals may be present within one lattice 16. The beam diameter of the electron beam that irradiates the sample is, for example, several μm. During measurement, a plurality of crystals in one lattice 16 are measured. When the measurement for one lattice 16 is completed or a satisfactory crystal is not found, a crystal is searched for in another lattice 16, and if crystals look satisfactory, the measurement is taken. This operation is then repeated sequentially.

The sample holder 7 can rotatably move between a set of predetermined angles as shown by arrow A around a center line X0 passing through the surface of the grid 15. The angle of incidence of the electron beam incident on the sample S can be changed by this rotational movement. Diffraction data from a plurality of crystal lattice planes (i.e., crystal lattice planes having different Miller indices) can be obtained by changing the angle of incidence of the electron beam.

FIG. 4 uses a block diagram to show the control device 3 included in the crystal structure analysis device 1 of FIG. 1. In FIG. 4, the control device 3 has a mathematical operation processing unit 21 and a memory 22. The mathematical operation processing unit 21 is constituted of, for example, a mathematical operation processing unit of a computer. The memory 22 is constituted of a storage device such as a semiconductor memory, a hard disk, or the like. An output terminal of the detector 13 in FIG. 1 is connected to the control device 3 via an input/output interface 23.

The memory 22 includes an area for storing a program that instructs the mathematical operation processing unit 21 of the computer to perform a crystal structure analysis procedure, an area for temporarily storing processing data during mathematical operation processing performed by a program, and an area that readably stores diffraction data that is the measurement result. The program may be a program recorded on a storage medium such as a compact disc (CD) and installed in a predetermined area of the memory 22.

The electron gun 5, the sample drive device 11, and the electromagnetic deflector 12 of FIG. 1 are connected to the control device 3 via the input/output interface 23. In addition, a display 24 such as a liquid crystal display device and an input device 25 such as a keyboard are connected to the control device 3 via the input/output interface 23.

The crystal structure analysis device 1 acquires, for example, a large number (for example, several hundred or more) of the diffraction profiles shown in FIG. 2(*a*), and performs data processing and structural analysis on these diffraction profiles. The crystal structure constituting the sample S (e.g., the crystal structure shown in FIG. 2(*b*)) is determined through this structural analysis. The electron beam diffraction measurement performed by the crystal structure analysis device 1 shall be described in detail below.

Sequential Measurement

FIG. 5 is a flowchart of a sequential measurement, which is one example of electron beam diffraction measurement realized by the crystal structure analysis device 1 in FIG. 1. This sequential measurement is a measurement method in which whether or not to perform merging is determined in a stage after the measurement of one sample grain (i.e., one crystal) is completed. Merging is the process of combining multiple sets of data into one piece of data. In the present specification, data obtained by merging may be referred to as merged data (i.e., post-merging data).

The control device 3 first initializes a reference value in step S1. Specifically, k=0 is set as the number of samples with measurement completed, Rint(0)=0.5 is set as the initial value of Rint, which is a first criterion for determining whether or not to performing merging, and (k)=0% is set for completeness, which is a second criterion for determining whether or not to performing merging.

"Rint" is a degree of coincidence of the intensities among equivalent reflections. Equivalent reflections are reflections that would form diffraction spots that should have the same intensity due to the symmetry of the crystal. The calculation formula is as follows.

$$R_{int} = \frac{\sum_{hkl} \sum_i |I_i(hkl) - \langle I(hkl) \rangle|}{\sum_{hkl} \sum_i I_i(hkl)}$$

In this formula, $|I_i(hkl)-[I(hkl)]|$ is the difference between average intensity and the intensity of the ith of i measured equivalent diffraction spots hkl. [I(hkl)] is the average intensity of i diffraction spots.

Dividing by $\Sigma_{hkl}\Sigma_i I_i(hkl)$ means normalizing by the sum of the intensities of i equivalent diffraction spots hkl measured. Since the sum of i equivalent diffraction spots (ΣiIi (hkl)) is further added for all hkl, ΣhklΣiIi(hkl) is the sum of the intensities of all the diffraction spots. Σhkl is the meaning of ΣhΣkΣl. Rint is a first criterion for determining whether or not to perform merging.

"Completeness" is described as follows. The number of diffraction spots to be measured can be calculated if the crystal lattice and diffraction symmetry (i.e., symmetry of the crystal) are known. For actual measurements, a measurement schedule is set up with focus on the diffraction spots to be measured, but not all the diffraction spots to be measured are necessarily measured. Completeness is an indicator of what proportion of diffraction spots are actually measured among the diffraction spots to be measured, and is ideally 100%. Completeness is a gauge of the quality of data and, by extension, of the reliability of structural analysis results. Completeness is a second criterion for determining whether or not to perform merging.

In order to achieve a target optical resolution, the number of diffraction spots to be measured can be calculated from the magnitude of a lattice constant and the symmetry of the crystal. The completeness is a value with the number of diffraction spots to be measured as the denominator and the number of reflections actually measured as the numerator. Completeness is actually a value from 0% to 100%. Under the current paper submission regulations of the International Union of Crystallography, a warning will be issued if the completeness is not at least 98.5% when the resolution is 0.83 angstroms.

Next, the control device 3 performs measurement on one crystal in step S3, and further performs data processing in step S4. In the data processing, diffraction spot intensity I, reliability SIG(I), Rint, and completeness are determined. Specifically, in FIG. 3, one sample S is irradiated with an electron beam while the incident angle of the radiation on the sample is continuously changed at a predetermined angular velocity. When this happens, a diffraction image is formed on the detector 13 in FIG. 1 by the electron beam diffracted by one sample S. The diffraction image is detected by the detector 13, and the diffraction data obtained by the detection is transmitted to the control device 3 in FIG. 4. The control device 3 determines the diffraction spot intensity and reliability (SIG(I)) for each crystal lattice plane (i.e., for each Miller index) on the basis of the transmitted diffraction data. Instead of continuously changing the angle of incidence of the radiation on the sample at a predetermined angular velocity, the angle of incidence of the radiation on the sample can be changed intermittently at predetermined time intervals, if necessary.

Data Data-1 in FIG. 6 is determined through the process described above. The control device 3 determines completeness regarding Data-1. FIG. 6 shows that 69% completeness was obtained for Data-1.

Next, in step S5, the control device 3 compares the current value of Rint(k) and the previous value of Rint(k−1). Since what is currently being considered is the first data, Data-1, the first data will be compared with the initial value of Rint. In this comparison, if Rint(k)≤Rint(k−1) (i.e., if Rint has not worsened), the determination in step S5 is YES and it is decided that merging will be performed on Data-1.

Next, the control device 3 drives the sample holder 7 shown in FIG. 1 by using the sample drive device 11 to move the sample holder 7 so that another sample will be irradiated with the electron beam. In this state, the crystal measurement of step S3 and the data processing of step S4 are performed again to obtain a large number of diffraction intensities and reliability values for each crystal lattice plane of this crystal. As a result, data Data-2 in FIG. 6 is obtained. If Rint has not worsened (YES in step S5), it is decided that merging will be performed on Data-2. The control device 3 also determines the completeness of Data-2.

Next, when it has been decided that merging will be performed on both Data-1 and Data-2, the control device 3 advances to step S6 and performs merging between Data-1 and Data-2. Specifically, the control device 3 performs (1) merging relating to the diffraction spot intensities of FIG. 6, (2) merging relating to the degrees of reliability SIG(I) of FIG. 6, and (3) merging of sections where data is missing in FIG. 6. The details are as follows.

(1) Merging Relating to the Diffraction Intensities $$I_{mean} = \frac{\sum_i \omega_i I_i}{\sum_i \omega_i} \qquad \text{(Formula 1)}$$

$$\omega_i = \frac{1}{\sigma_i^2} \qquad \text{(Formula 2)}$$

These formulas are used as the basis to determine the average (mean) intensity Imean of the same diffraction spots between the previous data Data-1 and the current data Data-2. This value is the merged intensity in the merged data (Data-1+Data-2) of FIG. 6.

The variable "i" is an index for adding up the number of diffraction spots having the same Miller index hkl (i.e., the same diffraction spots in crystallography). Generally, multiple identical diffraction spots are included in data obtained from individual measurements. Therefore, upon merging, there are the same number of identical diffraction spots as the sum of the numbers of identical diffraction spots included in the data of individual measurements. For example, if data 1 includes n1 diffraction spots and data 2 includes n2 diffraction spots, the range of index i is i=1 to N (N=n1+n2).

The variable "ωi" is the reciprocal of the square (variance) of reliability σi, and is a weight of the diffraction spots. The reliability in this case is "σi"=SIG(I). The variable "σi" is a statistical fluctuation (e.g., a standard difference) in the intensity of the diffraction spot i. Since this variable is a fluctuation, the reliability increases as the variable decreases. Therefore, for example, as the reliability decreases, i.e., as σ increases, ω decreases. Therefore, as ω decreases, the weighting will be treated as lower during averaging.

(2) Merging Relating to Reliability

The reliability in this case is $\sigma_{mean}$, $\sigma_{mean}$ being the reliability of intensity averaged by merging.

$$\sigma_{mean} = \max(\sigma_{int}, \sigma_{ext}) \qquad \text{(Formula 4)}$$

$$\sigma_{int} = \sqrt{\frac{n\sum_i \omega_i (I_i - I_{mean})^2}{(n-1)\sum_i \omega_i}} \qquad \text{(Formula 5)}$$

$$\sigma_{ext} = \sqrt{\frac{\sum_i \omega_i \sigma_i^2}{\sum_i \omega_i}} \qquad \text{(Formula 6)}$$

These formulas are used as the basis to determine the merged value of degrees of reliability $\sigma_{mean}$ of the averaged intensities of identical diffraction spots between Data-1 and Data-2. The greater (max) of the variables $\sigma_{int}$ and $\sigma_{ext}$ is used as the merged value of reliability $\sigma_{mean}$. This value is the merged reliability $\sigma_{mean}$ in (Data-1+Data-2) of FIG. 6.

The variable "$\sigma_{int}$" is determined by calculating the average variance again from the "average intensity $I_{mean}$," "Ii," and "weight ωi of diffraction spot i,", normalizing the average variance with a degree of freedom, and taking the square root (standard deviation) of the result. The variable "$\sigma_{ext}$" is the square root (standard deviation) of the average value of the averaged dispersion of diffraction spots.

(3) Merging of Sections Where Data is Missing

For example, in FIG. 6, sections (a), (b), and (c) of Data-1 are sections where data is present in Data-2, but data is missing from Data-1. Sections (d) and (e) of Data-2 are sections where data is present in Data-1, but data is missing from Data-2. In the present embodiment, data present in either set of data is recorded as a merged value in (Data-1+Data-2).

After the merged data (Data-1+Data-2) has been obtained through the above process, the control device 3 calculates the completeness of the data (Data-1+Data-2) in step S7. That is, when the lattice constant and symmetry of the crystal are determined, it is possible to calculate the number of diffraction spots to be measured at a specific resolution (usually 0.83 angstroms) in order to achieve the target optical resolution. The value obtained by dividing "the number of diffraction spots that actually could be measured" by "the number of theoretically measured diffraction spots, which is a theoretical value," is the completeness. That is, completeness=(Number of measured diffraction
    spots)/(Number of diffraction spots that theo-
    retically could be measured)

In the present embodiment, the completeness of the data Data-1 was 69%. The completeness of the data Data-2 was 65%. The completeness of the data (Data-1+Data-2) was 91%.

Next, in step S8, the control device 3 compares the completeness (k) of the current data and the completeness (k−1) of the previous data. Specifically, $$\text{completeness } (k) - \text{completeness } (k-1) \geq 5\% \qquad \text{(Formula 7)}$$

That is, whether or not the increase in completeness is 5% or more is checked. If the increase in completeness is less than 5% (NO in step S8), the data merged in S6 is discarded, the immediately previous data is retrieved, the process returns to steps S2 to S4, the next crystal is measured, and diffraction spot intensity and reliability are determined for the data of the next crystal (e.g., in the example of FIG. 6, Data-3 following Data-2). In addition, Rint is determined for Data-3. Data after Data-3 is omitted from illustration in FIG. 6.

Next, in step S5, the control device 3 determines whether or not Rint has become worse than Rint of the previous merged data, and if so (YES in step S5), the process advances to step S6, and merging is performed between the current data Data-3 and the merged data obtained as a result of the previous merge (e.g., the data (Data-1+Data-2) of FIG. 6). The completeness of the merged data is then calculated. Next, the control device 3 performs a completeness comparison in step S8 on the data (Data-1+Data-2+Data-3) obtained as a result of the merge. This process is performed until the increase in completeness 5% or more.

If the increase in completeness is 5% or more (YES in step S8), the process advances to step S10, and a check is made as to whether or not the completeness is equal to or greater than a predetermined specified value, e.g., 98.5%. If the completeness is less than the specified value (NO in step S10), the process returns to step S2, and a crystal measurement (step S3) and data processing (step S4) for obtaining data Data-4 are performed. According to the results of the evaluation of Rint (step S5), which is a criterion, and the evaluation of completeness (step S8), merging is performed again between the previous merged data and the current data (step S6).

As a result of the merging, if the increase in completeness is 5% or more in step S8 and the completeness of the current merged data is greater than the specified value in step S10 (YES in step S10), the process is ended. Through the above process, merged data (Data-1+Data-2+ . . . +Data-n) is obtained as a result of merging. The data after the merging does not include data that was determined to not be merged according to the Rint evaluation and the completeness evaluation. Through the above process, data is supplemented by merging, and even higher quality data can be obtained. In the present embodiment, for example, several to several thousand sets of Data-1, Data-2, . . . , Data-n of FIG. 6 are acquired.

As described above, in sequential measurement, whether or not to perform merging is determined at the stage where one crystal measurement is complete (e.g., the stage where Data-1, Data-2, . . . , Data-n have each been acquired), merging is performed on the multiple necessary sets of data, and final merged data that is high in quality due to data supplementation is obtained. Therefore, a crystal structure having high reliability can be acquired even when one piece of data contains few diffraction spots of reflection and only one piece of data does not yield a satisfactory crystal structure analysis result.

Second Embodiment: First Continuous Measurement

FIG. 7 shows an example of continuous measurement. Continuous measurement is a measurement method for deciding whether or not to merge at the stage where the measurements of a specified number of crystals (i.e., a specified number of sample grains) are all complete. The control device 3 first initializes a reference value in step S11. Specifically, k=0 is set as the number of measured samples, and a first specified value (e.g., several to several thousand) is set as the specified number.

Next, in steps S12 to S15, the control device 3 continuously performs measurement on only a number of crystals equal to the first specified value, and also performs data processing. Specifically, in FIG. 3, one sample S is irradiated with an electron beam while the angle of incidence of radiation on the sample is continuously changed at a predetermined angular velocity. At this time, a diffraction image is formed on the detector 13 of FIG. 1 by electron beams diffracted by the one sample S. The diffraction image is detected by the detector 13, and diffraction data obtained by the detection is transmitted to the control device 3 of FIG. 4. On the basis of the transmitted diffraction data, the control device 3 determines diffraction spot intensity (I), reliability (SIG(I)), Rint, completeness, FOM, and crystal orientation for each crystal lattice plane (i.e., for each Miller index). As a result, for example, the data Data-1 of FIG. 6 is obtained. Instead of continuously changing the angle of incidence of radiation on the sample at a predetermined angular velocity, the angle of incidence of radiation on the sample can be changed intermittently at predetermined time intervals, if necessary.

In step S14, the control device 3 calculates diffraction spot intensity (I), reliability (SIG(I)), Rint, completeness, FOM (k), and crystal orientation. The data processing of S14 is the same as the data processing of step S4 in FIG. 5. In addition, "FOM" is an abbreviation of figure of merit (an effectiveness factor).

$$FOM = a \times (1 - Rint) + b \times \text{completeness} \qquad \text{(Formula 8)}$$

Figure 8:
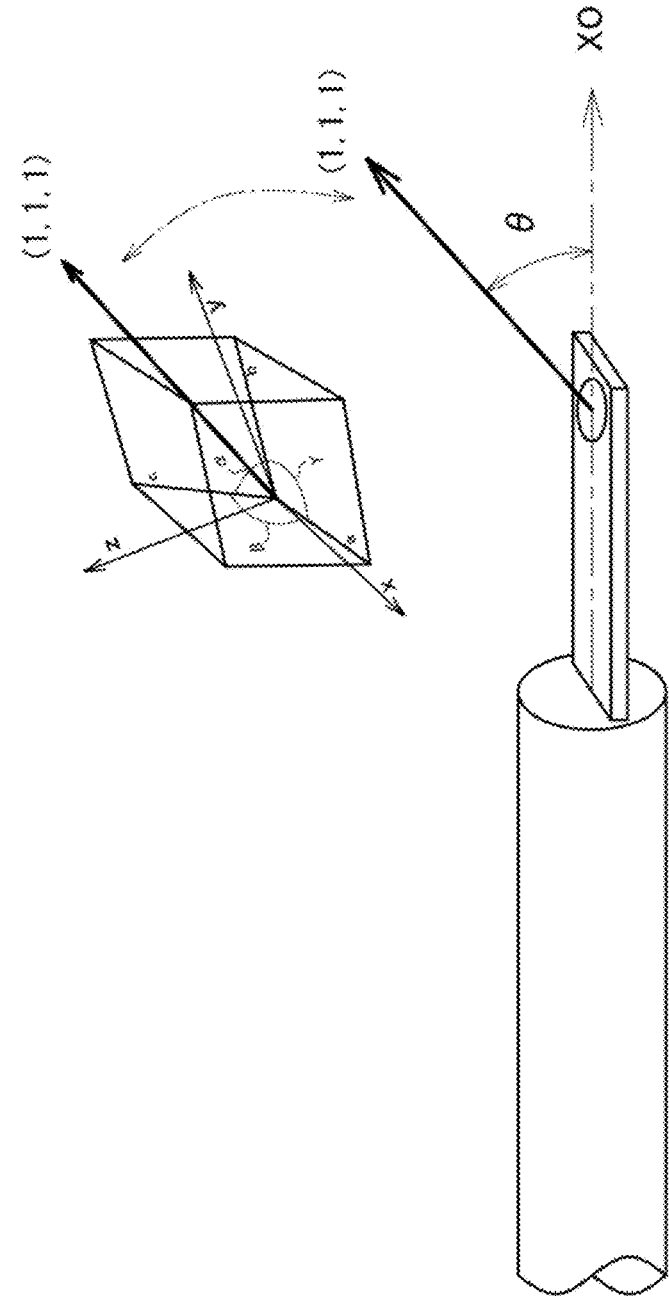
FIG. 8 is a view for describing a change in crystal orientation, which is one of merging criteria.

"Crystal orientation" is calculated as an angle θ formed by, for example, the (1, 1, 1) axis of the crystal and the sample rotation axis X0, as shown in FIG. 8. The crystal axis is not limited to the (1, 1, 1) axis and an appropriate axis can be selected as necessary.

Crystal measurement (step S13) and data processing, FOM calculation, and crystal orientation calculation (step S14) are repeated until the number of crystal measurements reaches the first specified value (step S15). The data Data-2, . . . , Data-n of FIG. 6 is thereby obtained. Illustration of data after Data-3 is omitted in FIG. 6. When the number of measurements reaches the first specified value (YES in step S15), the control device 3 sorts (i.e., arranges) the diffraction data Data-1, Data-2, . . . , Data-n in order from the highest FOM(k), in order from the lowest Rint, or in order from the highest completeness in step S16.

Furthermore, the control device 3 sets a second specified value as the number of specifications for the sorted diffraction data in step S17. This second specified value is a numerical value equal to or less than the first specified value of step S11. Next, if the change in crystal orientation is 10° or more in step S20 (YES in step S20), the control device 3 performs merging in step S21.

The specific merging procedure is the same as that of the sequential measurement of FIG. 5, which was described with reference to FIG. 6. That is, (Data-1+Data-2) is created by merging Data-1 and Data-2 in the sorted order, then (Data-1+Data-2+Data-3) is created by merging (Data-1+Data-2) and Data-3, and this sequence is repeated. Merging is not performed on data for which the change in crystal orientation is lower than 10° (NO in step S20). This is because if the change in crystal orientation is lower than 10°, the possibility of satisfactory completeness is low even if merging is performed, and the necessity of merging is low.

Next, in step S22, the control device 3 calculates the completeness of the diffraction data obtained as a result of merging. If the increase in completeness is less than 5% (NO in step S23), the data merged in S21 is discarded, the immediately previous data is retrieved (data(i)=data(i−1)), the process returns to steps S18 to S22, merging is repeated, and completeness is calculated. If the increase in completeness is 5% or more in step S23 (YES in step S23), the process is ended when the completeness is equal to or greater than a specified value in step S24.

As described above, in the first continuous measurement, whether or not to merge is determined at the stage where measurement of a specified number of crystals has ended (e.g., the stage where all of the Data-1, Data-2, . . . , Data-n of FIG. 6 has been acquired), merging is performed on the necessary multiple sets of data, and the data is supplemented, whereby high-quality data is obtained. Therefore, one piece of data contains few diffraction spots of reflection, and a crystal structure having high reliability can be acquired even when only one piece of data does not yield a satisfactory crystal structure analysis result.

In the present embodiment, multiple sets of acquired diffraction data are sorted in order from highest FOM, in order from lowest Rint, or in order from highest completeness, and then merging is performed sequentially on the multiple sets of diffraction data. Therefore, according to the present embodiment, a crystal structure having high reliability can be obtained efficiently with few mergings.

In the present embodiment, since merging is performed upon uniquely defining crystal orientation in step S20, the efficiency of merging can be increased, and a crystal structure having high reliability can be obtained efficiently with even fewer mergings.

Third Embodiment: Second Continuous Measurement

FIG. 9 shows another example of continuous measurement. This second continuous measurement is also a measurement method for deciding whether or not to merge at the stage where measurements of a specified number of crystals are all complete. The control device 3 first initializes a reference value in step S31. Specifically, k=0 is set as the number of measured samples, and a first specified value (e.g., several to several thousand) is set as the specified number.

Next, in steps S32 to S36, the control device 3 continuously performs measurement on only a number of crystals equal to the first specified value, and also performs data processing, as in the case of the first continuous measurement of FIG. 7. Specifically, in FIG. 3, one sample S is irradiated with an electron beam while the angle of incidence of radiation on the sample is continuously changed at a predetermined angular velocity. When this happens, a diffraction image is formed on the detector 13 of FIG. 1 by electron beam diffracted by the one sample S. The diffraction image is detected by the detector 13, and diffraction data obtained by the detection is transmitted to the control device 3 of FIG. 4. On the basis of the transmitted diffraction data, the control device 3 determines diffraction spot intensity (I), reliability (SIG(I)), Rint, completeness, FOM, and crystal orientation for each crystal lattice plane (i.e., for each Miller index). As a result, for example, the data Data-1 of FIG. 6 is obtained. Instead of continuously changing the angle of incidence of radiation on the sample at a predetermined angular velocity, the angle of incidence of radiation on the sample can be changed intermittently at predetermined time intervals, if necessary.

Furthermore, in step S34, the control device 3 calculates diffraction spot intensity (I), reliability (SIG(I)), Rint, completeness, FOM(k), and crystal orientation. FOM and crystal orientation are calculated in the same way as in the first continuous measurement of FIG. 7.

Furthermore, in step S35, the control device 3 classifies the data Data-1 into clusters on the basis of a crystal lattice. The crystal lattice is defined by an a-axis length, a b-axis length, a c-axis length, an α angle, a β angle, and a γ angle, as shown in FIG. 10. For example, as shown in FIG. 11, if cytidine, acetaminophen, and potassium tetrachloroplatinate (11) are taken as an example, the respective crystal lattices thereof are specified by the lengths of a, b, and c and the angles of α, β, and γ of FIG. 11.

If the values of a, b, c, α, β, and γ are different among multiple substances, those substances have different crystal structures and are different compounds. In the present embodiment shown in FIG. 9, in step S35, substances whose values of a, b, c, α, β, and γ are within ±10% are classified as substances belonging to the same cluster. Regarding which item to perform cluster classification on, any item can be selected and applied as needed.

Crystal measurement (step S33), data processing/FOM calculation/crystal orientation calculation (step S34), and cluster classification (step S35) are continuously repeated until the number of measured crystals reaches the first specified value (step S36). As a result, the Data-2, . . . , Data-n of FIG. 7 are obtained. When the number of measurements reaches the first specified value (YES in step S36), in step S37, the control device 3 sorts (i.e., arranges) the data Data-1, Data-2, . . . , Data-n in order from highest FOM(k), in order from lowest Rint, or in order from highest completeness.

Furthermore, in step S38, the control device 3 sets a second specified value as the specified number of sorted data. The second specified value is a numerical value equal to or less than the first specified value of step S31. Next, in step S41, if the change in crystal orientation is 10° or more (YES in step S41), the control device 3 performs merging in step S42.

The specific merging procedure is the same as in the case of sequential measurement of FIG. 5, which was described with reference to FIG. 6. However, in the present embodiment, merging is performed within the same cluster, and merging is not performed among substances in different clusters. That is, for multiple sets of diffraction data belonging to the same cluster, (Data-1+Data-2) is created by merging Data-1 and Data-2 in the order in which the data was sorted, and then (Data-1+Data-2+Data-3) is created by merging (Data-1+Data-2) and Data-3, and this procedure is repeated hereinafter. Merging is not performed (NO in step S41) on data with which the change in crystal orientation is less than 10°.

Next, in step S43, the control device 3 calculates completeness for the diffraction data obtained as the result of merging. If the increase in completeness is less than 5% (NO in step S44), the data merged in S42 is discarded, the immediately previous data is retrieved (data(i)=data(i−1)), the sequence returns to steps S39 to S43, merging is repeated, and completeness is calculated. If the increase in completeness is 5% or more in step S44 (YES in step S44), the process is ended when the completeness is equal to or greater than a specified value in step S45.

As described above, in the second continuous measurement, whether or not to merge is determined at the stage where measurement of a specified number of crystals has ended (e.g., the stage where all of the Data-1, Data-2, . . . , Data-n of FIG. 6 has been acquired), merging is performed on the necessary multiple sets of data, and the data is supplemented, whereby high-quality data is obtained. Therefore, a crystal structure having high reliability can be acquired, even when one piece of data contains few diffraction spots of reflection, and therefore, only one piece of data does not yield a satisfactory crystal structure analysis result.

In the present embodiment, multiple sets of acquired diffraction data are sorted in order from highest FOM, in order from lowest Rint, or in order from highest completeness, and then the data is classified into clusters and merging is performed sequentially on the multiple sets of diffraction data. Therefore, according to the present embodiment, a crystal structure having high reliability can be obtained efficiently with few mergings.

In the present embodiment, since merging is performed upon uniquely defining crystal orientation in step S41, the efficiency of merging can be increased, and a crystal structure having high reliability can be obtained efficiently with even fewer mergings.

Furthermore, in the present embodiment, the following can be said because multiple sets of data are classified into clusters on the basis of a lattice constant. Specifically, microcrystals having basically the same crystal system of the same compound are present in the sample holder 7 of FIG. 3. However, data belonging to different clusters have different lattice constants and can therefore be said to be data of "different compounds." The data is otherwise "polymorphism" which is the same compound but has a different crystal structure. Therefore, with multiple sets of data, data in the same cluster is merged and the structures thereof must be analyzed as separate structures. Data among different cluster (i.e., data of crystals having different crystal structures) must not be merged. Therefore, in the present embodiment, multiple sets of diffraction data obtained from a plurality of crystals and clustered according to lattice constant are merged within the same cluster.

Fourth Embodiment: Third Continuous Measurement

FIG. 12 shows yet another example of continuous measurement. This third continuous measurement is a measurement method for deciding whether or not to merge at the stage where measurements of a specified number of crystals are all complete. The third embodiment has basically the same flow as the second embodiment shown in FIG. 9. The difference between the second embodiment (FIG. 9) and the third embodiment (FIG. 12) is that the cluster classification step in step 35 of the second embodiment is put at step 59 of the third embodiment, i.e., between the sorting step of step S56 and the step of determining the rate of change in crystal orientation of step 61.

In the present third continuous measurement as well, whether or not to perform merging is determined at the stage where a specified number of crystal measurements are complete (e.g., the stage where Data-1, Data-2, . . . , Data-n have all been acquired), and merging is performed on the multiple necessary sets of data, and then data that is high in completeness due to data supplementation is obtained. Therefore, a crystal structure having high reliability can be acquired even when one piece of data contains few diffraction spots of reflection, and therefore, only one piece of data does not yield a satisfactory crystal structure analysis result.

Even in the present embodiment, multiple sets of acquired diffraction data are sorted in order from highest FOM, in order from lowest Rint, or in order from highest completeness, and then the data is classified into clusters and merging is performed sequentially on the multiple sets of diffraction data. Therefore, according to the present embodiment, a crystal structure having high reliability can be obtained efficiently with few mergings.

In the present embodiment, since merging is performed upon uniquely defining crystal orientation in step S61, the efficiency of merging can be increased, and a crystal structure having high reliability can be obtained efficiently with even fewer mergings.

Furthermore, in the present embodiment, the following can be said because multiple sets of data are classified into clusters on the basis of a lattice constant. Specifically, microcrystals having basically the same crystal system of the same compound are present in the sample holder 7 of FIG. 3. However, data belonging to different clusters have different lattice constants and can therefore be said to be data of "different compounds." The data is otherwise "polymorphism" which is the same compound but has a different crystal structure. Therefore, with multiple sets of data, data in the same cluster is merged and the structures thereof must be analyzed as separate structures. Data among different cluster (i.e., data of crystals having different crystal structures) must not be merged. Therefore, in the present embodiment, multiple sets of diffraction data obtained from a plurality of crystals and clustered according to lattice constant are merged within the same cluster.

Fifth Embodiment

In the embodiment shown in FIG. 5, whether or not to merge data is determined at the stage where data (Data-1) is acquired for a first sample grain, then whether or not to merge data is determined at the stage where data (Data-2) is acquired for a second sample grain, and at the stage where two sets of data to be merged are available, the data is merged and merged data is acquired. Furthermore, data regarding the next sample grain is acquired, whether or not to perform further merging is determined, and when merging is to be performed, the already acquired merged data and the next data are merged. Such a merging process is repeated sequentially for a plurality of sample grains.

In the embodiment shown in FIG. 7, at the stage where data (Data-1, Data-2, . . . , Data-n) has been continuously acquired for a predetermined number of sample grains, whether or not to merge the data is determined, and multiple sets of data determined to be merged are sorted. According to the sorted order, two sets of data are merged to obtain merged data, and the merged data is merged with the next data. Such a merging process is then repeated.

In the embodiments shown in FIGS. 9 and 12, basically in the same manner as the embodiment shown in FIG. 7, at the stage where data (Data-1, Data-2, . . . , Data-n) has been continuously acquired for a predetermined number of sample grains, whether or not to merge the data is determined, and multiple sets of data determined to be merged are sorted. According to the sorted order, two sets of data are merged to obtain merged data, and the merged data is merged with the next data. Furthermore, in the embodiments shown in FIGS. 9 and 12, multiple sets of acquired data are classified into clusters according to lattice constant, and data is merged within the same cluster.

As described above, in the embodiments shown in FIGS. 5, 7, 9, and 12, the merging process is performed with every two sets of acquired data. However, the present invention is not limited to these embodiments, and also includes performing a merging process such as the following. Specifically, by irradiating every three or more sample grains among a plurality of grains with radiation while the angle of incidence of the radiation is changed, diffraction spot intensities and degrees of reliability for a plurality of crystal lattice planes within each sample grain are determined, and three or more sets of data (for example, the Data-1, Data-2, . . . , Data-n of FIG. 6) are acquired at once. Furthermore, for three or more sets of data that have been determined to need to be merged among the acquired data, it is also possible to perform all at once the merging processes for combining the multiple sets of data into one.

Other Embodiments

Although the present invention has been described above with reference to preferred embodiments, the present invention is not limited to the embodiments; various modifications can be made within the scope of the invention as set forth in the claims.

For example, the structure of the electron microscope mechanism part 2 shown in FIG. 1 and the structure of the control device 3 shown in FIG. 4 are only examples; other structures can be adopted as necessary.

In the embodiments described above, the required number of diffraction profiles shown in FIG. 2(a), e.g., several hundred or more, were acquired by electron beam diffraction. However, the diffraction profile can also be acquired using radiation other than electron beams, e.g., X-rays, neutron beams, etc.

REFERENCE SIGNS LIST

1: crystal structure analysis device, 2: electron microscope mechanism part, 3: control device, 4: column, 5: electron gun, 6: condenser lens, 7: sample holder, 8: objective lens, 9: intermediate lens system, 10: projection lens system, 11: sample drive device, 12: electromagnetic deflector, 13: detector, 15: grid, 16: lattices, R: electron beam, S: sample, X0: center line, Q: diffraction image

The invention claimed is:

1. A crystal structure analysis method in which a crystal structure is determined on the basis of a plurality of samples, the crystal structure analysis method comprising:
   a data acquisition step in which each of the plurality of samples are irradiated with radiation while the angle of incidence of the radiation is continuously changed by rotating the sample, whereby diffraction spot intensities and degrees of reliability for a plurality of crystal lattice planes in the individual samples are determined and data is acquired;
   a merging determination step in which whether or not to perform merging, which is a process of combining multiple sets of data into one, is determined for each individual piece of data on the basis of a merging criterion;
   a merging execution step in which merging, which is a process for combining multiple sets of data into one, is performed on data for which it was determined that merging is to be performed; and
   a crystal structure identification step in which a crystal structure is determined according to merged data obtained as a result of the merging.

2. The crystal structure analysis method according to claim 1,
   wherein in the data acquisition step, while a first sample, which is one of the plurality of samples, is irradiated with radiation, the angle of incidence of the radiation on the first sample is continuously changed by rotating the sample, whereby diffraction spot intensities and degrees of reliability for a plurality of crystal lattice planes in the first sample are determined and first data is acquired, and
   the sample being irradiated with radiation is replaced with a second sample, which is another of the plurality of samples, and the angle of incidence of the radiation on the second sample is continuously changed by rotating the sample, whereby diffraction spot intensities and degrees of reliability for a plurality of crystal lattice planes in the second sample are determined and second data is acquired;
   wherein in the merging determination step, whether or not to perform merging, which is a process for combining multiple sets of data into one, is determined for both the first data and the second data on the basis of a merging criterion; and
   wherein in the merging execution step, merging, which is a process for combining multiple sets of data into one, is performed on the first data for which it was determined that merging is to be performed and the second data for which it was determined that merging is to be performed.

3. The crystal structure analysis method according to claim 2,
   wherein radiation is also irradiated onto an nth (n being positive integer other than 1 and 2) sample other than the first sample and the second sample in the plurality of samples and the angle of incidence of the radiation on the nth sample is continuously changed by rotating the sample, whereby diffraction spot intensities and degrees of reliability for a plurality of crystal lattice planes in the sample are determined and nth data is acquired;
   wherein whether or not to perform merging is determined for the nth data on the basis of a merging criterion; and
   wherein nth data for which it was determined that merging is to be performed is also merged with merged data that was obtained until the nth data is acquired.

4. The crystal structure analysis method according to claim 1, wherein in the data acquisition step, three or more of the plurality of samples are individually irradiated with radiation while the angle of incidence of the radiation is continuously changed by rotating the sample, whereby diffraction spot intensities and degrees of reliability for a plurality of crystal lattice planes in the individual samples are determined and data is acquired; and wherein in the merging execution step, merging, which is a process for combining the multiple sets of data into one, is performed on three or more sets of data for which it was determined that merging is to be performed.

5. The crystal structure analysis method according to claim 1, wherein the merging is at least one of the following: merging according to diffraction spot intensity, merging according to reliability (SIG(I)), and merging that supplements sections where data is missing.

6. The crystal structure analysis method according to claim 1, wherein the merging criterion is Rint and/or completeness and/or crystal orientation.

7. The crystal structure analysis method according to claim 1, wherein in the merging determination step, the determination of whether or not to perform merging is performed on the individual sets of data each time one of the multiple sets of data is acquired.

8. The crystal structure analysis method according to claim 1, wherein in the merging determination step, the determination of whether or not to perform merging is performed on each of the acquired multiple sets of data after a predetermined number of the multiple sets of data have been acquired.

9. The crystal structure analysis method according to claim 8, wherein the predetermined number of acquired data sets are arranged on the basis of a sorting criterion.

10. The crystal structure analysis method according to claim 9, wherein the sorting criterion is at least one of the following: FOM, Rint, and completeness.

11. The crystal structure analysis method according to claim 8, wherein:

after the predetermined number of sets of the data has been acquired, the acquired multiple sets of data are classified into clusters on the basis of crystal lattices, merging is performed on data classified in the same cluster, and merging is not performed among different data.

12. A crystal structure analysis device that identifies a crystal structure on the basis of a plurality of samples, said device comprising:

a radiation source that emits radiation;

a radiation incidence means that causes the radiation emitted from the radiation source to be incident on the samples;

a sample drive device that moves the samples;

a detector that detects radiation diffracted by the samples;

a mathematical operation processing unit that controls the actions of the radiation source, the radiation incidence means, the sample drive device, and the detector and executes a mathematical operation for crystal structure analysis on a signal outputted by the detector; and a program that instructs the mathematical operation processing unit to perform a crystal structure analysis procedure, wherein the program causes the mathematical operation processing unit to execute the following steps:

a data acquisition step in which each of the plurality of samples are irradiated with radiation while the angle of incidence of the radiation is continuously changed by rotating the sample, whereby diffraction spot intensities and degrees of reliability for a plurality of crystal lattice planes in the individual samples are determined and data is acquired;

a merging determination step in which whether or not to perform merging, which is a process of combining multiple sets of data into one, is determined for each individual piece of data on the basis of a merging criterion;

a merging execution step in which merging, which is a process for combining multiple sets of data into one, is performed on data for which it was determined that merging is to be performed; and a crystal structure determination step in which a crystal structure is determined according to merged data obtained as a result of the merging.

13. A program that instructs a crystal structure analysis procedure to be performed, in which a crystal structure is determined on the basis of a plurality of samples, said program causing a computer to execute the following procedures:

a procedure in which each of the plurality of samples are irradiated with radiation while the angle of incidence of the radiation is continuously changed by rotating the sample, whereby diffraction spot intensities and degrees of reliability for a plurality of crystal lattice planes in the individual samples are determined and data is acquired;

a procedure in which whether or not to perform merging, which is a process of combining multiple sets of data into one, is determined for each individual set of data on the basis of a merging criterion;

a procedure in which merging, which is a process for combining multiple sets of data into one, is performed on data for which it was determined that merging is to be performed; and a procedure in which a crystal structure is determined according to merged data obtained as a result of the merging.

* * * * *